United States Patent
Fujii et al.

[11] Patent Number: 6,040,377
[45] Date of Patent: Mar. 21, 2000

[54] CHLOROPRENE RUBBER COMPOSITION

[75] Inventors: Nobuhiko Fujii; Mitsuyuki Nakada; Kazuomi Aoki, all of Niigata, Japan

[73] Assignee: Denki Kagaku Kogyo Kabushiki Kaisha, Tokyo, Japan

[21] Appl. No.: 09/252,202

[22] Filed: Feb. 18, 1999

[30] Foreign Application Priority Data

Feb. 19, 1998 [JP] Japan .................................. 10-037452

[51] Int. Cl.$^7$ ....................................................... D03J 1/00
[52] U.S. Cl. .......................... 524/571; 524/495; 428/462; 428/463
[58] Field of Search ..................... 524/495, 571; 428/462, 463

[56] References Cited

U.S. PATENT DOCUMENTS 4,699,180 10/1987 Stefan et al. .

FOREIGN PATENT DOCUMENTS 0 679 683 11/1995 European Pat. Off. .

*Primary Examiner*—Mark Warzel
*Attorney, Agent, or Firm*—Oblon, Spivak, McClelland, Maier & Neustadt, P.C.

[57] ABSTRACT

A chloroprene rubber composition which contains carbon black and of which the breaking elongation A and the static modulus in shear B of the vulcanizate satisfy the following formula:

$$A \geq -36.4 \times B + 1090 \qquad (1)$$

where A is the breaking elongation (%) and B is the static modulus in shear (kgf/cm$^2$).

13 Claims, No Drawings

CHLOROPRENE RUBBER COMPOSITION

The present invention relates to a chloroprene rubber composition. More particularly, it relates to a chloroprene rubber composition for bearing, which is excellent in the vulcanization bonding property, etc., and of which the vulcanizate has a high static modulus in shear and a high breaking elongation, its vulcanizate and a bearing obtained by using it.

A laminated rubber bearing is disposed between a base for a structure such as a bridge or a building and the upper structure thereon and used mainly to prolong the natural period of a vibration system of the entire structure, thereby to reduce the response of the structure to an earthquake motion. It has a structure having rubber sheets and steel plates alternately laminated in plural layers, which is required to have high rigidity and high yield strength in a vertical direction and low rigidity and large deformability in a horizontal direction.

With respect to the properties of the rubber material, it is required to have a high static modulus in shear (hereinafter referred to simply as GS) and a high breaking elongation (hereinafter referred to simply as EB). As such a rubber material, natural rubber or chloroprene rubber is used. With respect to the required properties, the chloroprene rubber is required to have a GS of 10±1 kgf/cm² and an EB of at least 440%, as prescribed in "Highway Bridge Bearing Handbook", complied by Japan Road Association and published in Jul. 1991.

On the other hand, along with a trend for large sizes of bridges and buildings in recent years, it is desired to further increase GS and EB of laminated rubber bearing rubber materials.

To increase GS of chloroprene rubbers for general applications, it has been common from the polymerization aspect ① to increase the copolymerization ratio of sulfur or ② to increase crosslinking points by adjusting the polymerization temperature, and from the blend formulation aspect, ③ to increase the amount or change the type of the reinforcing filler such as carbon black, ④ to incorporate a reinforcing resin such as a phenol resin, or ⑤ to increase the amount or change the type of the vulcanization accelerator.

However, such methods have had drawbacks such as deterioration of the low temperature resistance, the scorch resistance, the thermal aging resistance or the compression set. Further, when it is attempted to increase GS, EB usually tends to decrease. Accordingly, it has been difficult to obtain a chloroprene rubber composition which satisfies various requirements while maintaining a high balance of GS and EB as a bearing rubber, such as a chloroprene rubber composition, of which the static modulus in shear of the vulcanizate is adjusted at a high GS at a level of 13.5 kgf/cm², while maintaining a high EB at a level of a breaking elongation of 600%, or a chloroprene rubber composition which presents a vulcanizate having a high balance such that the static modulus in shear is 8 kgf/cm² while EB is as high as at least 800%.

It is an object of the present invention to solve the above problems and to provide a chloroprene rubber composition suitable for a laminated rubber bearing, which satisfies a high GS and a high EB of the vulcanizate simultaneously and which has a good balance of other mechanical properties and a good low temperature resistance and yet is excellent in the vulcanization bonding property, its molded vulcanizate and a bearing employing it.

The present inventors have conducted an extensive study to solve the above problems and as a result, have found it possible to solve the problems by a combination of a specific chloroprene rubber and carbon black. The present invention has been accomplished on the basis of this discovery.

Namely, the present invention provides a choroprene rubber composition which contains carbon black and of which the breaking elongation A and the static modulus in shear B of the vulcanizate satisfy the following formula:

$$A \geq -36.4 \times B + 1090 \tag{1}$$

where A is the breaking elongation (%) and B is the static modulus in shear (kgf/cm²).

In the above formula, B is preferably from 4 to 20, more preferably from 6 to 18, most preferably from 8 to 16.

Further, the present invention provides a molded vulcanizate of the above chloroprene rubber composition, and a bearing employing such a vulcanizate.

The present invention also provides a chloroprene rubber composition for bearing, which is a chloroprene rubber composition comprising a xanthogen-modified chloroprene rubber and a carbon black other than acetylene black, or a chloroprene rubber composition comprising a chloroprene rubber other than a xanthogen-modified chloroprene rubber and acetylene black, or a chloroprene rubber composition comprising a xanthogen-modified chloroprene rubber and acetylene black.

Further, the present invention provides a bearing prepared by vulcanizing such a chloroprene rubber composition, and also a bearing having at least one lamination comprising such a chloroprene rubber vulcanizate and a metal plate laminated one on the other.

Now, the present invention will be described in detail with reference to the preferred embodiments.

The rubber component in the chloroprene rubber composition of the present invention contains a chloroprene rubber as the main component, but may contain in addition to the chloroprene rubber, other rubbers such as natural rubber, butyl rubber, BR, NBR or EPDM, as the case requires. The content of such other rubbers is preferably from 0 to 50 phr.

The chloroprene rubber of the present invention may be a homopolymer of chloroprene or a copolymer (hereinafter often referred to as a chloroprene rubber) obtained by polymerizing a mixture (hereinafter referred to as a chloroprene monomer) comprising chloroprene and at least one other copolymerizable monomer.

Monomers copolymerizable with chloroprene include, for example, 2,3-dichloro-1,3-butadiene, 1-chloro-1,3-butadiene, sulfur, styrene, acrylonitrile, methacrylonitrile, isoprene, butadiene as well as acrylic acid, methacrylic acid and esters thereof, and they can be used within a range to satisfy the purpose of the present invention.

With respect to the method for polymerization to obtain the chloroprene rubber to be used in the present invention, there is no particular limitation, and a conventional polymerization method may be employed. Namely, the chloroprene monomer may be emulsion-polymerized by a conventional method in the presence of a commonly employed polymerization initiator, to obtain the chloroprene rubber.

The emulsifier to be used for this emulsion polymerization is not particularly limited, and an emulsifier which is commonly used for the emulsion polymerization of chloroprene, such as an alkali metal salt of a $C_{6-22}$ saturated or unsaturated fatty acid, an alkali metal salt of rosin acid or disproportionated rosin acid, or an alkali metal salt of a formalin condensate of β-naphthalene sulfonic acid, may, for example, be used.

Chloroprene rubbers are polymers of chloroprene and can be produced by emulsion polymerization. However, depending upon the type of the molecular weight modifier, they may be classified into a sulfur-modified chloroprene rubber, a mercaptan-modified chloroprene rubber and a xanthogen-modified chloroprene rubber., The sulfur-modified chloroprene rubber is one obtained by copolymerizing sulfur and chloroprene to obtain a polymer and plasticizing the polymer with thiuram disulfide to have a predetermined Mooney viscosity. The mercaptan-modified chloroprene rubber is one obtained by using as a molecular weight modifier an alkyl mercaptan such as n-dodecyl mercaptan, tert-dodecyl mercaptan or octyl mercaptan. Likewise, the xanthogen-modified chloroprene rubber is one prepared by using as a molecular weight modifier an alkylxanthogen compound.

As the chloroprene rubber composition of the present invention, a chloroprene rubber modified by any method, can be used. However, the xanthogen-modified chloroprene rubber is most preferred, since it is thereby possible to obtain a product which has an excellent balance of a high GS and a high EB and is excellent in the balance of other mechanical properties such as tensile strength, modulus, etc., and in the low temperature resistance, the scorch resistance, the thermal aging resistance and the compression set, and yet which is excellent further in the processability and the vulcanization bonding property.

Specific examples of the alkylxanthogen compound include dimethylxanthogen disulfide, diethylxanthogen disulfide, diisopropylxanthogen sulfide and diisobutylxanthogen disulfide.

The amount of the alkylxanthogen compound is selected so that the molecular weight of the chloroprene polymer (or the Mooney viscosity of a chloroprene rubber obtainable by isolating the polymer) will be proper. It is used usually in an amount within a range of from 0.05 to 5.0 parts by weight, preferably from 0.3 to 1.0 part by weight, per 100 parts by weight of the chloroprene monomer, although the amount may vary depending upon the structure of the alkyl group or the desired molecular weight.

As the polymerization initiator, known potassium persulfate, ammonium persulfate, sodium persulfate, hydrogen peroxide or an organic peroxide such as t-butyl hydroperoxide, may, for example, be used, which is commonly used for emulsion polymerization of chloroprene.

In the present invention, the polymerization temperature and the final conversion of the monomer are not particularly limited. However, the polymerization temperature is preferably from 0 to 50° C., more preferably from 20 to 50° C. Further, the polymerization is preferably carried out so that the monomer conversion will be within a range of from 60 to 90%, and when this conversion has been reached, a small amount of a polymerization inhibitor may be added to terminate the polymerization.

As such a polymerization inhibitor, a commonly employed inhibitor such as thiodiphenylamine, 4-tert-butylcatechol or 2,2-methylenebis-4-methyl-6-tert-butylphenol, may, for example, be used.

An unreacted monomer may be removed, for example, by steam stripping, and then the pH of the latex is adjusted, followed by conventional freeze solidification, washing with water and hot air drying to isolate the polymer.

The carbon black to be incorporated to the chloroprene rubber composition of the present invention may be any one of thermal black and acetylene black prepared by a thermal decomposition method and furnace black and channel black prepared by an incomplete combustion method. However, furnace black and acetylene black are advantageously used, since the reinforcing effects are substantial. Such a carbon black is preferably one having a DBP oil absorption of at least 50 ml/100 g, more preferably from 100 to 400 ml/100 g, most preferably from 150 to 350 ml/100 g.

Acetylene black is a carbon black obtainable by thermally decomposing acetylene gas and is most preferred, since the crystallization is advanced, the structure is developed, the oil absorption is large, and the chloroprene rubber composition employing such acetylene black as a reinforcing agent presents a vulcanizate having a high GS and a high EB.

The amount of carbon black is preferably from 20 to 80 parts by weight, more preferably from 30 to 60 parts by weight, per 100 parts by weight of the chloroprene rubber. If the amount exceeds 80 parts by weight, the processability tends to be poor, scorch is likely to take place, and the embrittlement temperature of the vulcanizate tends to be high. If the amount is less than 20 parts by weight, the tensile strength and the modulus tend to be low.

The chloroprene rubber composition of the present invention is required to satisfy the above formula (1), and it is preferably a chloroprene rubber composition having furnace black incorporated to a xanthogen-modified chloroprene rubber, more preferably a chloroprene rubber composition having acetylene black incorporated as a carbon black, most preferably a chloroprene rubber composition having acetylene black incorporated as a carbon black to a xanthogen-modified chloroprene rubber, since a rubber vulcanizate obtained by vulcanizing such a composition will have both a high static modulus in shear and a high breaking elongation, as well as a good balance of other mechanical properties and yet is excellent in the vulcanization bonding property, and thus it has excellent properties as a rubber composition for bearing.

The vulcanizer to be used in the present invention is not particularly limited, but is preferably a metal oxide. Specifically, zinc oxide, magnesium oxide, lead oxide, trilead tetraoxide, iron trioxide, titanium dioxide or calcium oxide may, for example, be mentioned. These oxides may be used in combination as a mixture of two or more of them. Further, by using it in combination with the following vulcanization accelerator, vulcanization can be carried out more effectively. The amount of such a vulcanizer is preferably from 3 to 15 parts by weight, per 100 parts by weight of the chloroprene rubber.

As the vulcanization accelerator, a vulcanization accelerator of thiourea type, guanidine type, thiuram type or thiazol type, which is commonly used for vulcanization of a chloroprene rubber, can be used. However, one of thiourea type is preferred. As a vulcanization accelerator of thiourea type, ethylenethiourea, diethylthiourea, trimethylthiourea, triethylthiourea or N,N'-diphenylthiourea may, for example, be mentioned, and trimethylthiourea is particularly preferred. The above vulcanization accelerators may be used in combination as a mixture of two or more of them. The amount of such a vulcanization accelerator is preferably from 0.5 to 5 parts by weight, per 100 parts by weight of the chloroprene rubber.

To the chloroprene rubber composition of the present invention, various additives such as a softening agent, a processing aid, an aging-preventing agent, a lubricant, a filler, etc., may be incorporated as the case requires.

The chloroprene rubber composition of the present invention has excellent processability and can be mixed by a kneading machine such as a kneader, a Banbury mixer or a roll mill in the same manner as for a usual chloroprene rubber and molded into a desired shape to obtain a molded vulcanizate. Specifically, various components are mixed at a temperature of not higher than the vulcanization temperature, and then, the kneaded product is formed into a desired shape, followed by vulcanization. The temperature and the time for vulcanization may suitably be set. The vulcanization temperature is preferably from 140 to 180° C., more preferably from 150 to 180° C.

The chloroprene rubber composition of the present invention may be formed into a sheet, and such a sheet and a metal plate may be alternately laminated, followed by vulcanization bonding to obtain a bearing, as disclosed on pages 26 and 200 of "Highway Bridge Bearing Handbook", complied by Japan Road Association and published in Jul., 1991.

The chloroprene rubber composition of the present invention is excellent in the processability and the vulcanization bonding property, and its vulcanizate has a high static modulus in shear and a high breaking elongation and is excellent in other mechanical properties, and it is accordingly very useful as a rubber material for bearing.

Now, the present invention will be described in further detail with reference to Examples. However, it should be understood that the present invention is by no means restricted to such specific Examples.

EXAMPLES 1 TO 9 AND COMPARATIVE EXAMPLES 1 TO 5

Blend compositions were prepared in accordance with the blend formulation as identified in Tables 1, 2 and 3, and the processabilities and the vulcanization bonding properties were evaluated, and with respect to the vulcanizates, physical property tests were carried out, and the results are shown in Tables 1, 2 and 3. The mechanical properties such as the tensile strength, the modulus and the static modulus in shear were obtained in accordance with JIS K6301.

The embrittlement temperature was measured by a low temperature impact embrittlement test in accordance with JIS K6301.

With respect to the roll processability, the operation efficiency was evaluated by carrying out a cutting operation of a non-vulcanized product for 3 minutes, by using 8 inch rolls at the roll temperature of 50° C. with a nip of 1.14 mm.

The vulcanization bonding property was determined by a 90 degree peeling test of a rubber from a metal piece in accordance with JIS K-6256 (a bonding test method for vulcanized rubber), wherein Chemlok 205 and 220, manufactured by Lord Corporation were used as the vulcanization adhesive, and an iron piece was used as the metal piece.

TABLE 1

| Blend formulation, unit: phr | Ex. 1 | Ex. 2 | Ex. 3 | Ex. 4 | Ex. 5 |
|---|---|---|---|---|---|
| Chloroprene rubber | | | | | |
| DCR-66 1) | 100 | 100 | | 100 | 100 |
| DCR-42A 2) | | | 100 | | |
| S-40 3) | | | | | |
| DCR-74 5) | | | | | |
| DCR-45 6) | | | | | |
| Acetylene black 8) | | | | 32 | 36 |
| Carbon black | | | | | |
| MAF (Sheast 116) 9) | 32 | 32 | 32 | | |
| SRF (Asahi #50) 10) | | | 10 | 10 | 10 |
| Asahi #15HS | | 10 | | | |
| Polybutadiene | 3 | 3 | 3 | 5 | 3 |
| Phenol resin 11) | | | | | |
| Stearic acid | 0.5 | 0.5 | 0.5 | 0.5 | 0.5 |

TABLE 1-continued

| Blend formulation, unit: phr | Ex. 1 | Ex. 2 | Ex. 3 | Ex. 4 | Ex. 5 |
|---|---|---|---|---|---|
| Aging-preventing agent | | | | | |
| Amine type | 3 | 3 | 3 | 3 | 3 |
| Imidazole type | 0.5 | 0.5 | 0.5 | 0.5 | 0.5 |
| Magnesia | 4 | 4 | 4 | 4 | 4 |
| Silica | 11 | 11 | 11 | 11 | 11 |
| Dioctyl azelate | 12 | 12 | 10 | 14 | 12 |
| Wax | 1 | 1 | 1 | 1 | 1 |
| Cumarone resin | 2 | 2 | 2 | 2 | 2 |
| Polyethylene | 1 | 1 | 1 | 1 | 1 |
| Zinc white | 5 | 5 | 5 | 5 | 5 |
| Vulcanization accelerator | | | | | |
| Thiourea type | 1.2 | 1.2 | 1.2 | 1.2 | 1.2 |
| Thiuram type | 1 | 1 | 1 | 1 | 1 |
| Thiazole type | 1 | 1 | 1 | 1 | 1 |
| Total (phr) | 178.2 | 188.2 | 186.2 | 192.2 | 192.2 |
| (Physical properties of non-vulcanized product) Scorch time (Ms, 121° C.) t5 (minutes) | 23 | 18 | 19 | 23 | 19 |
| (Physical properties of vulcanized rubber) Vulcanization: 155° C. × 60 minutes | | | | | |
| 100% modulus (kgf/cm$^2$) | 20 | 27 | 26 | 22 | 25 |
| Tensile strength (kgf/cm$^2$) | 219 | 203 | 215 | 193 | 179 |
| Hardness (JIS-A) | 61 | 65 | 67 | 64 | 67 |
| Static modulus in shear (kgf/cm$^2$) | 11.7 | 14.8 | 13.4 | 11.8 | 14.2 |
| Compression set (100° C. × 22 hrs) | 32 | 33 | 33 | 33 | 32 |
| Breaking elongation (%) | 685 | 559 | 607 | 775 | 675 |
| Embrittlement Temperature (° C.) | −40 | −40 | −42 | −40 | −38 |
| (Thermal aging-resistance) 100° C. × 70 hrs | | | | | |
| Change in tensile strength (%) | ±0 | −2 | −2 | −3 | −6 |
| Change in breaking elongation (%) | −4 | −3 | −13 | −10 | −16 |
| Change in 25% modulus (%) | +23 | +17 | +17 | +20 | +18 |
| Roll processability | Good | Good | Good | Good | Good |
| Rubber/metal vulcanization bonding property | Good | Good | Good | Good | Good |

Materials used in Tables 1, 2 and 3 are as follows.
1) Xanthogen-modified chloroprene rubber, manufactured by Denki Kagaku Kogyo K.K.
2) Xanthogen-modified chloroprene rubber, manufactured by Denki Kagaku Kogyo K.K.
3) Mercaptan-modified chloroprene rubber, manufactured by Denki Kagaku Kogyo K.K.
4) Mercaptan-modified chloroprene rubber, manufactured by Denki Kagaku Kogyo K.K.
5) Mercaptan-modified chloroprene rubber, manufactured by Denki Kagaku Kogyo K.K.
6) Sulfur-modified chloroprene rubber, manufactured by Denki Kagaku Kogyo K.K.
7) Mercaptan-modified chloroprene rubber, manufactured by Denki Kagaku Kogyo K.K.

8) Granule product (DBP oil absorption: 160 ml/100 g), manufactured by Denki Kagaku Kogyo K.K.

9) Sheast 116, manufactured by Tokai Carbon K.K.

10) #50, manufactured by Asahi Carbon K.K.

11) PR-12686, manufactured by Sumitomo Dures K.K.

TABLE 2

| Blend formulation, unit: phr | Ex. 6 | Ex. 7 | Ex. 8 | Ex. 9 |
|---|---|---|---|---|
| Chloroprene rubber | | | | |
| DCR-66 1) | | | | |
| DCR-42A 2) | | | 100 | |
| S-40 3) | | 100 | | |
| DCR-74 5) | | | | |
| DCR-45 6) | 100 | | | |
| DCR-35 7) | | | | 100 |
| Acetylene black 8) | | | 38 | 50 |
| Carbon black | | | | |
| MAF (Sheast 116) 9) | 32 | 32 | | |
| SRF (Asahi #50) 10) | 10 | 10 | 10 | 10 |
| Asahi #15HS | | | | |
| Polybutadiene | 3 | 3 | 5 | 3 |
| Phenol resin 11) | | 10 | | |
| Stearic acid | 0.5 | 0.5 | 0.5 | 0.5 |
| Aging-preventing agent | | | | |
| Amine type | 3 | 3 | 3 | 3 |
| Imidazole type | 0.5 | 0.5 | 0.5 | 0.5 |
| Magnesia | 4 | 4 | 4 | 4 |
| Silica | 11 | 11 | 11 | 11 |
| Dioctyl azelate | 10 | 10 | 14 | 14 |
| Wax | 1 | 1 | 1 | 1 |
| Cumarone resin | 2 | 2 | 2 | 2 |
| Polyethylene | 1 | 1 | 1 | 1 |
| Zinc white | 5 | 5 | 5 | 5 |
| Vulcanization accelerator | | | | |
| Thiourea type | 1.2 | 1.2 | 1.2 | 1.2 |
| Thiuram type | 1 | 1 | 1 | 1 |
| Thiazole type | 1 | 1 | 1 | 1 |
| Total (phr) | 186.2 | 196.2 | 198.2 | 208.2 |
| (Physical properties of non-vulcanized product) Scorch time (Ms, 121° C.) t5 (minutes) | 10 | 8 | 14 | 12 |
| (Physical properties of vulcanized rubber) Vulcanization: 155° C. × 60 minutes | | | | |
| 100% modulus (kgf/cm²) | 34 | 26 | 25 | 33 |
| Tensile strength (kgf/cm²) | 197 | 147 | 183 | 167 |
| Hardness (JIS-A) | 72 | 74 | 67 | 72 |
| Static modulus in shear (kgf/cm²) | 16.9 | 12.1 | 13.3 | 16.1 |
| Compression set (100° C. × 22 hrs) | 45 | 37 | 35 | 31 |
| Breaking elongation (%) | 500 | 761 | 688 | 549 |
| Embrittlement temperature (° C.) | −41 | −37 | −41 | −40 |
| (Thermal aging-resistance) 100° C. × 70 hrs | | | | |
| Change in tensile strength (%) | −1 | +3 | −1 | −1 |
| Change in breaking elongation (%) | −10 | −29 | −13 | −4 |
| Change in 25% modulus (%) | +19 | +53 | +21 | +25 |

TABLE 2-continued

| Blend formulation, unit: phr | Ex. 6 | Ex. 7 | Ex. 8 | Ex. 9 |
|---|---|---|---|---|
| Roll processability | Good | Good | Good | Good |
| Rubber/metal vulcanization bonding property | Good | Good | Good | Good |

TABLE 3

| Blend formulation, unit: phr | Comp. Ex. 1 | Comp. Ex. 2 | Comp. Ex. 3 | Comp. Ex. 4 | Comp. Ex. 5 |
|---|---|---|---|---|---|
| Chloroprene rubber | | | | | |
| DCR-66 1) | | | | | |
| DCR-42A 2) | | | | | |
| S-40 3) | 100 | 100 | 100 | | 80 |
| M-40 4) | | | | | 20 |
| DCR-74 5) | | | | 100 | |
| DCR-45 6) | | | | | |
| Acetylene black 8) | | | | | |
| Carbon black | | | | | |
| MAF (Sheast 116) 9) | 32 | 32 | 32 | 32 | 18 |
| SRF (Asahi #50) 10) | 10 | 10 | 10 | 10 | 16 |
| Asahi #15HS | | 10 | | | |
| Polybutadiene | 3 | 3 | 3 | 3 | 3 |
| Phenol resin 11) | | | | | |
| Stearic acid | 0.5 | 0.5 | 0.5 | 0.5 | 0.5 |
| Aging-preventing agent | | | | | |
| Amine type | 3 | 3 | 3 | 3 | 3 |
| Imidazole type | 0.5 | | | 0.5 | 0.5 |
| Magnesia | 4 | 4 | 4 | 4 | 4 |
| Silica | 11 | 11 | 11 | 11 | 11 |
| Dioctyl azelate | 10 | 10 | 10 | 10 | |
| Aromatic oil | | | | | 3 |
| Rapeseed oil | | | | | 4 |
| Wax | 1 | 1 | 1 | 1 | 1 |
| Cumarone resin | 2 | 2 | 2 | 2 | 2 |
| Polyethylene | 1 | 1 | 1 | 1 | 1 |
| Zinc white | 5 | 5 | 5 | 5 | 5 |
| Vulcanization accelerator | | | | | |
| Thiourea type | 1.2 | 2 | 1.2 | 1.2 | 1.2 |
| Thiuram type | 1 | | | 1 | 1 |
| Thiazole type | 1 | | | 1 | 1 |
| Total (phr) | 186.2 | 184.5 | 183.7 | 186.2 | 175.2 |
| (Physical properties of non-vulcanized product) Scorch time (Ms, 121° C.) t5 (minutes) | 21 | 19 | 10 | 20 | 17 |
| (Physical properties of vulcanized rubber) Vulcanization: 155° C. × 60 minutes | | | | | |
| 100% modulus (kgf/cm²) | 23 | 36 | 37 | 23 | 19 |
| Tensile strength (kgf/cm²) | 194 | 169 | 177 | 187 | 188 |
| Hardness (JIS-A) | 66 | 68 | 70 | 66 | 63 |
| Static modulus in shear (kgf/cm²) | 12 | 15.4 | 17.2 | 11 | 11.2 |
| Compression set (100° C. × 22 hrs) | 25 | 11 | 15 | 38 | 27 |

TABLE 3-continued

| Blend formulation, unit: phr | Comp. Ex. 1 | Comp. Ex. 2 | Comp. Ex. 3 | Comp. Ex. 4 | Comp. Ex. 5 |
| --- | --- | --- | --- | --- | --- |
| Breaking elongation (%) | 562 | 307 | 314 | 613 | 660 |
| Embrittlement temperature (° C.) | −41 | −41 | −41 | −37 | −36 |
| (Thermal aging-resistance) 100° C. × 70 hrs | | | | | |
| Change in tensile strength (%) | −4 | +5 | +3 | −2 | +3 |
| Change in breaking elongation (%) | −15 | −6 | −7 | −7 | −2 |
| Change in 25% modulus (%) | +16 | +11 | +10 | +16 | +12 |
| Roll processability | Good | Good | Good | Good | Good |
| Rubber/metal vulcanization bonding property | Good | Good | Good | Good | Good |

EXAMPLE 10

Using the chloroprene rubber composition obtained in Example 8, eight rubber layers of 310 mm×310 mm×7.5 mm (in thickness) and seven steel plates (SS400) of 300 mm×300 mm×2.3 mm (thickness) were alternately laminated and then vulcanized at a temperature of 155° C. for a vulcanization time of 120 minutes to obtain a bearing.

By exerting a bearing stress of 80 kgf/cm$^2$, shear deformations of ±70%, ±150%, ±175% and ±250% were loaded three times each, and from the third deformation curves, shear spring constants were calculated. Further, from the shear spring constants, a static modulus in shear was obtained.

Further, after measuring the 250% shear spring constant, shear deformation was continuously loaded until shear breakage, and the deformation at the time of the shear breakage was obtained. The results are shown in Table 4.

Comparative Example 6

Using the chloroprene rubber composition obtained in Comparative Example 5, a bearing was prepared and measured in the same manner as in Example 10, and the results are shown in Table 4.

TABLE 4

| | Ex. 10 | Comp. Ex. 6 |
| --- | --- | --- |
| Static modulus in shear obtained from 70% deformation (kgf/cm$^2$) | 11.4 | 9.5 |
| Shear breakage strain (%) | 486 | 469 |

As shown in Tables 1 and 2, the chloroprene rubber composition of the present invention is such that its vulcanizate has both a high static modulus in shear (GS) and a high breaking elongation (EB), has a good balance of other mechanical properties and a good low temperature resistance and yet is excellent in the vulcanization bonding property, and thus it has particularly excellent properties as a rubber composition for bearing. Further, as shown in Table 4, the bearing employing the chloroprene rubber composition of the present invention has excellent properties.

We claim:

1. A chloroprene rubber composition which contains carbon black and of which the breaking elongation A and the static modulus in shear B of the vulcanizate satisfy the following formula:

$$A \geq -36.4 \times B + 1090 \tag{1}$$

where A is the breaking elongation (%) and B is the static modulus in shear (kgf/cm$^2$).

2. The chloroprene rubber composition according to claim 1, wherein B is from 4 to 20.

3. A chloroprene rubber composition for bearing, which consists essentially of the chloroprene rubber composition as defined in claim 1.

4. The chloroprene rubber composition according to claim 1, wherein the carbon black is acetylene black.

5. The chloroprene rubber composition according to claim 1, wherein the chloroprene rubber is a xanthogen-modified chloroprene rubber.

6. A chloroprene rubber vulcanizate obtained by vulcanizing the chloroprene rubber composition as defined in claim 1.

7. A chloroprene rubber vulcanizate for bearing, which consists essentially of the chloroprene rubber vulcanizate as defined in claim 6.

8. A bearing containing the chloroprene rubber vulcanizate for bearing as defined in claim 6.

9. A bearing having at least one lamination comprising a metal plate and the chloroprene rubber vulcanizate as defined in claim 6 laminated one on the other.

10. A chloroprene rubber composition for bearing, which is a chloroprene rubber composition comprising a xanthogen-modified chloroprene rubber and a carbon black other than acetylene black, or a chloroprene rubber composition comprising a chloroprene rubber other than a xanthogen-modified chloroprene rubber and acetylene black, or a chloroprene rubber composition comprising a xanthogen-modified chloroprene rubber and acetylene black.

11. A chloroprene rubber composition for bearing, which is a chloroprene rubber composition comprising a xanthogen-modified chloroprene and acetylene black.

12. A bearing prepared by vulcanizing the chloroprene rubber composition as defined in claim 10.

13. A bearing having at least one lamination comprising a metal plate and a vulcanizate of the chloroprene rubber composition as defined in claim 10 laminated one on the other.

* * * * *